United States Patent
Daimon et al.

(10) Patent No.: US 6,875,253 B2
(45) Date of Patent: Apr. 5, 2005

(54) METAL ALLOY FINE PARTICLES AND METHOD FOR PRODUCING THEREOF

(75) Inventors: Hideo Daimon, Ibaraki (JP); Yukiko Kurobe, Tokyo (JP); Naoki Toshima, Tokyo (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 10/467,593

(22) PCT Filed: Feb. 6, 2002

(86) PCT No.: PCT/JP02/00947
§ 371 (c)(1),
(2), (4) Date: Dec. 3, 2003

(87) PCT Pub. No.: WO02/062509
PCT Pub. Date: Aug. 15, 2002

(65) Prior Publication Data
US 2004/0074336 A1 Apr. 22, 2004

(30) Foreign Application Priority Data

| Feb. 8, 2001 | (JP) | ........................ 2001-032319 |
| Feb. 23, 2001 | (JP) | ........................ 2001-047567 |
| Jul. 30, 2001 | (JP) | ........................ 2001-229384 |
| Sep. 20, 2001 | (JP) | ........................ 2001-286434 |

(51) Int. Cl.$^7$ ................................................ B22F 1/00
(52) U.S. Cl. ............................ 75/255; 75/351; 75/363; 977/DIG. 1
(58) Field of Search ......................... 75/255, 351, 363; 977/DIG. 1

(56) References Cited

U.S. PATENT DOCUMENTS 5,759,230 A * 6/1998 Chow et al. ................... 75/362
6,254,662 B1 * 7/2001 Murray et al. ................ 75/348
6,262,129 B1 * 7/2001 Murray et al. ................ 516/33

FOREIGN PATENT DOCUMENTS

EP     0977212 A2    2/2000    ............. H01F/1/00

OTHER PUBLICATIONS

Shouheng Sun et al., "Monodisperse FePt Nanoparticles and Ferromagnetic FePt Nanocrystal Superlattices", Science, vol. 287, No. 5460, Mar. 17, 2000; pp. 1989–1992.

* cited by examiner

Primary Examiner—Ngoclan T. Mai
(74) Attorney, Agent, or Firm—Osha & May L.L.P.

(57) ABSTRACT

A novel method for preparing fine particles comprising a transition metal and a noble metal which are monodispersed and have almost no particle diameter distribution, and are transferable to a CuAu-I type $L1_0$ ordered phase, with safety and at a low cost, wherein a salt or a complex of at least one transition metal selected from Fe and Co and a salt or a complex of at least one transition metal selected from Pt and Pd (exclusive of the combination of Co—Pd) is dissolved in an organic solvent miscible with water or an alcohol in the presence of an organic protecting agent, and the resultant solution is heated under reflux in the presence of an alcohol in an inert atmosphere, to thereby prepare a binary alloy comprising a transition metal and a noble metal, or a salt or a complex of at least one element selected from the group consisting of Cu, Bi, Sb, Sn, Pb and Ag is further dissolved in the above solvent and the resultant solution is heated under reflux in the presence of an alcohol in an inert atmosphere, to thereby prepare a ternary alloy comprising a transition metal, a noble metal and an additional element.

25 Claims, No Drawings

US 6,875,253 B2

METAL ALLOY FINE PARTICLES AND METHOD FOR PRODUCING THEREOF

TECHNICAL FIELD

The present invention relates to metal alloy fine particles and a method for synthesizing the same. In particular, the present invention relates to magnetic metal alloy fine particles having improved thermal and temporal stability and a method for synthesizing the same.

BACKGROUND ART

With the development of information society, there is a strong demand for development of magnetic recording media that allow high density recording, and the in-depth research and development in the recent few years has realized media with a remarkable high density. However, as the information society is expected to evolve further in the future, there is no technological prospect that market needs will be satisfied in ten or twenty years ahead. A large factor that causes this technological impasse is the following problem of the current magnetic recording media.

Thin films for the current magnetic recording media are alloy thin films based on CoCr. In these thin films, magnetic separation of micro-regions responsible for magnetism is insufficient, so that relatively large magnetic clusters that are coupled magnetically are formed. The size is in the submicron to micron order. In view of the fact that the minimum bit size in the current magnetic recording technology is in the submicron order, which is about the same level as the size of the magnetic clusters, the limit has almost been reached in terms of recording resolution. In order to overcome this limit of the current technology, it is necessary to magnetically insulate magnetic particles in a recording medium and reduce the size of the magnetic clusters.

As a breakthrough to solve this problem, a granular medium was proposed. The granular medium has a structure in which magnetic particles are precipitated in a non-magnetic matrix such as an oxide, and the magnetic particles are magnetically insulated almost completely by the non-magnetic substance interposed therebetween. Therefore, each particle is the minimum magnetization unit and it is possible to record in a high density to an extent of at least this size. In recent years, it has been reported that in the granular medium in which magnetic particles are dispersed and precipitated in a $SiO_2$ non-magnetic matrix, high density recording is possible, and noise can be reduced by preventing large magnetic clusters from being formed.

As described above, the granular medium is a very promising possibility as the next generation super high-density recording medium, but it has a serious problem such as thermal disturbance in the recorded state. In general, a magnetic substance exhibits crystalline magnetic anisotropy that reflects the spatial symmetry of the crystal lattice. For example, in cobalt having a hexagonal close-packed arrangement, the magnetic energy is lowest when the spin is oriented to the direction of the crystal principal axis (c axis), and the magnetic energy is increased when it is displaced from that direction. The magnetic energy is largest when the spin is oriented to the direction orthogonal to the c axis. In other words, if there is no force from the external field, the spin is oriented to either one of the two directions of the c axis direction.

The utilization of binary information of this spin orientation is the basis of magnetic recording. When one magnetic particle is focused on, the total magnetic anisotropic energy thereof is a result obtained by multiplying the volume of the particle by the magnetic anisotropic constant that is determined inherently by the substance. This energy dominates the degree of spin constraint to a stable direction, and leads to the preservation of a recorded state. If the volume of a magnetic particle is extremely small, and the magnetic anisotropic energy is about in the same level as the thermal energy, then thermal disturbance constantly swings the orientation of the spin (i.e., recorded state), so that the recorded state cannot be kept stable.

In the granular medium, very fine particles are almost completely isolated by a non-magnetic substance, this thermal disturbance becomes a very serious problem. Therefore, the granular medium has problems in terms of the thermal stability or the long-term preservability of recorded information, and thus the granular medium is regarded as being difficult to put into practice. In order to solve these problems, it is necessary to essentially increase the anisotropic energy of the magnetic substance, and for this purpose, it has been proposed to use an alloy having a high crystalline magnetic anisotropy for the magnetic recording medium.

Magnetic materials such as FePt, FePd and CoPt exhibit large uniaxial crystalline magnetic anisotropy (FePt: $7 \times 10^7$ erg/cc, saturation magnetization 1140 emu/cc, CoPt: $5 \times 10^7$ erg/cc, saturation magnetization 800 emu/cc) in the CuAu-I type $L1_0$ ordered phase (γ1 phase, face-centered tetragonal). The anisotropic energy is at least 20 times larger than that of conventional CoCr alloy based magnetic recording materials, and these materials are gaining attention as magnetic materials that can solve the problem of thermal disturbance in high density magnetic recording as described above.

In recent years, in the field of thin film media, there are a large number of studies regarding FePt, and it is reported that when a thin film of FePt is subjected to a heat treatment at a temperature of 600 to 700° C. in a vacuum, then a transition to the $L1_0$ ordered phase occurs, a large crystal magnetic anisotropy is exhibited, and the coercive force reaches 10,000 Oe.

IBM Corporation of the United States released the studies regarding the synthesis of $Fe_{52}Pt_{48}$ fine particles by a chemical approach in March 2000 (see Monodisperse FePt Nanoparticles and Ferromagnetic FePt Nanocrystal Superlattices, S. Sun et al., Science, Vol. 287, p1989–1992 (2000)). The FePt fine particles are monodisperse, has a diameter of about 4 nm and almost no particle size distribution, and are self-aligned in the closest packing manner. Also in the chemical production of IBM, a heat treatment at 550 to 600° C. is necessary to cause a transition to the $L1_0$ ordered phase in the FePt fine particles. After the heat treatment, the anisotropic energy of the FePt fine particles is estimated to be $5.9 \times 10^7$ erg/cc, and the $KuV/k_BT$ value, which indicates the thermal fluctuation stability, is estimated to be 48.

In the method for synthesizing FePt fine particles of IBM, an iron carbonyl complex ($Fe(CO)_5$) and a platinum complex ($Pt(C_5H_7O_2)_2$) are used. The platinum ions are reduced to metal platinum with 1,2-hexadecane diol, and the iron carbonyl complex is subjected to thermal decomposition to produce iron. As organic protective agents, oleylamine and oleic acid are added to dioctyl ether, which is a synthetic reaction system solvent, and FePt fine particles are synthesized from the atoms of the two metals. These organic protective agents (oleylamine and oleic acid) have a very important role in the synthesis of the FePt fine particles, and thus the particle size of the FePt fine particles are controlled, and the FePt fine particles are separated with a predetermined interval by their molecular steric hindrance for magnetic insulation of the fine particles from each other.

It can be said that the FePt fine particles of IBM showed an ideal form of a material for high density magnetic recording. The fine particles are completely insulated magnetically by the organic protective agent, and the minimum unit of magnetization is as small as 4 nm and uniform. The FePt fine particles dispersed with the organic protective agent are soluble in a solvent and thus can be expected to be used for a hard disk or an application-type medium for high density recording by applying the solvent with the FePt fine particles to a non-magnetic substrate.

However, in the method for synthesizing the FePt fine particles of IBM, iron pentacarbonyl ($Fe(CO)_5$) is used as the source of iron. $Fe(CO)_5$ is a highly toxic and flammable liquid, and produces carbon monoxide which is harmful to the human body in the process of the reaction, as shown in the following reaction formula:

$$Fe(CO)_5 \rightarrow Fe + 5CO$$

The synthesis of toxic and flammable materials is hazardous, and the synthesis method that may produce harmful substances is a backward movement to the current trend from the industrial and environmental preservation point of view. In addition, iron pentacarbonyl is more expensive than iron sulfate ($FeSO_4\text{-}7H_2O$), which is a common iron source. In order to solve this problem, as the source of Fe or Co, their sulfates, chloride salts, phosphates, and sulfonates are used. These compounds do not produce harmful carbon monoxide in the synthesis process, and are less expensive than iron pentacarbonyl. However, in this method, a composition (Fe content: 40 to 50 at %) of a transition metal that is necessary for a phase transition to the $L1_0$ ordered phase by a heat treatment cannot be obtained, and the compositions of Fe and Co are about 15 to 25%. Moreover, there is a method as follows: The pH of a reaction solution is adjusted to 9 to 12, and a hydroxide colloid comprising a transition metal and a noble metal is prepared, so that the difference in the oxidation-reduction potential between the transition metal and the noble metal is eliminated, and thus metal alloy fine particles made of the transition metal and the noble metal that are zelovalent in the oxidization state are produced. However, also in this method, the compositions of Fe and Co are about 39%. Furthermore, when they are synthesized in an alkaline atmosphere, the particle size becomes as small as 1 to 1.5 nm, and thermal demagnetization may occur.

Therefore, it is an object of the present invention to provide a novel method for synthesizing monodisperse metal alloy fine particles having a uniform particle size that constitute the basis of the CuAu-I type $L1_0$ ordered phase and are made of a transition metal and a noble metal safely and inexpensively.

SUMMARY OF THE INVENTION

The present invention solved the above problem by providing metal alloy fine particles having a composition expressed by a general formula (1):

$$A_xB_{1-x} \tag{1}$$

(where A is at least one selected from the group consisting of Fe and Co, and B is at least one selected from the group consisting of Pt and Pd, (provided that a combination of Co—Pd is excluded), and 40 at % $\leq x \leq$ 60 at %), or metal alloy fine particles having a composition expressed by a general formula (2):

$$A_xB_yC_z \tag{2}$$

(where A is at least one selected from the group consisting of Fe and Co, B is at least one selected from the group consisting of Pt and Pd (provided that a combination of Co—Pd is excluded), and C is at least one element selected from the group consisting of Cu, Bi, Sb, Sn, Pb and Ag, and 2 at % $\leq z \leq$ 30 at %, and $2/3 \leq x/y \leq 3/2$).

The metal alloy fine particles expressed by the general formula (1) is produced by:

(a) dissolving the following substances in an alcohol alone, water and an alcohol, or an alcohol and an organic solvent that can be mixed with the alcohol in the presence of an organic protective agent:

(i) a salt or a complex of at least one transition metal selected from the group consisting of Fe and Co, and (ii) a salt or a complex of at least one noble metal selected from the group consisting of Pt and Pd (provided that a combination of Co—Pd is excluded); and (b) performing heating under reflux with an alcohol in an inert atmosphere.

Following the step (b), the step (c) of filtrating the obtained product and heating the product at a temperature of 550 to 600° C. in an inert atmosphere can be included further.

Furthermore, the metal alloy fine particles expressed by the general formula (2) is produced by:

(a) dissolving the following substances in an alcohol alone, water and an alcohol, or an alcohol and an organic solvent that can be mixed with the alcohol in the presence of an organic protective agent:

(i) a salt or a complex of at least one transition metal selected from the group consisting of Fe and Co, (ii) a salt or a complex of at least one noble metal selected from the group consisting of Pt and Pd (provided that a combination of Co—Pd is excluded); and (iii) a salt or a complex of at least one additional element selected from the group consisting of Cu, Bi, Sb, Sn, Pb and Ag; and (b) performing heating under reflux with an alcohol in an inert atmosphere.

Following the step (b), the step (c) of filtrating the obtained product and heating the product at a temperature of 300 to 500° C. in an inert atmosphere can be included further.

The metal alloy fine particles having the composition expressed by the general formula (1) or (2) and having the CuAu-I type $L1_0$ ordered phase can be used as a magnetic recording material, and therefore this magnetic recording material can be used to form a magnetic layer of a magnetic recording medium

DETAILED DESCRIPTION OF THE INVENTION

In the present invention, metal alloy fine particles that can be ordered in a CuAu-I type $L1_0$ ordered lattice are binary alloys including FePt, FePd or CoPt or ternary alloys including these alloy and at least one additional element selected from the group consisting of Cu, Bi, Sb, Sn, Pb and Ag. Binary alloys or ternary alloys including CoPd cannot be ordered in a CuAu-I type $L1_0$ ordered lattice, and therefore are excluded from the metal alloy fine particles of the present invention.

Regarding the transition metal and the noble metal that are constituent elements of the binary alloys or the ternary alloys, two types can be mixed, as long as metal alloy fine particles that can be ordered in a CuAu-I type $L1_0$ ordered lattice are substantially formed. For example, Co can be mixed with Fe, and Pd can be mixed with Pt.

The binary metal alloy fine particles of the present invention have a composition expressed by a general formula (1):

$$A_x B_{(1-x)} \tag{1}$$

where A is at least one selected from the group consisting of Fe and Co, and B is at least one selected from the group consisting of Pt and Pd (provided that a combination of Co—Pd is excluded), and 40 at % $\leq x \leq$ 60 at %. In the case of the binary alloys, if the composition is other than this composition, a complete transition to the CuAu-I type $L1_0$ ordered phase in the fine particles is not achieved after a heat treatment, and a desired crystal magnetic anisotropy energy cannot be obtained, and as a result, sufficient thermal stability cannot obtained.

The ternary metal alloy fine particles of the present invention have a composition expressed by a general formula (2):

$$A_x B_y C_z \tag{2}$$

where A is at least one selected from the group consisting of Fe and Co, B is at least one selected from the group consisting of Pt and Pd (provided that a combination of Co—Pd is excluded), and C is at least one element selected from the group consisting of Cu, Bi, Sb, Sn, Pb and Ag, and 2 at % $\leq z \leq$ 30 at %, and $2/3 \leq x/y \leq 3/2$).

It is possible to reduce the temperature of the phase transition to the CuAu-I type $L1_0$ ordered phase by adding at least one element selected from the group consisting of Cu, Bi, Sb, Sn, Pb and Ag to the binary alloy including FePt, FePd or CoPt that is expressed by the general formula (1) so as to provide the ternary alloy expressed by the general formula (2). For example, the phase transition temperature of the binary alloy including FePt, FePd or CoPt is in the range from 550 to 600° C., but the phase transition temperature of the ternary alloy obtained by adding at least one element selected from the group consisting of Cu, Bi, Sb, Sn, Pb and Ag is reduced to 300 to 500° C.

The additional elements such as Cu, Bi, Sb, Sn, Pb and Ag do not form a solid solution with respect to FePt, FePd or CoPt and have a low surface energy. Therefore, these additional elements are diffused on the surface of the fine particles and a large number of vacancies are generated in the internal portion of the alloy fine particles by a heat treatment. It seems that the vacancies generated in the internal portion of the fine particles promote the phase transition to the CuAu-I type $L1_0$ ordered phase, so that the temperature of the phase transition to the ordered phase is decreased.

As described above, in the general formula (2), when the composition of the additional element is less than 2 at %, the temperature of the phase transition to the CuAu-I type $L1_0$ ordered phase is not decreased. When the composition of the additional element is more than 30 at %, the decrease of the temperature of the phase transition to the $L1_0$ ordered phase is saturated. Furthermore, when x/y is smaller than 2/3 or larger than 3/2, sufficient crystal magnetic anisotropy cannot be obtained after the heat treatment, and consequently sufficient thermal stability cannot be obtained.

Furthermore, it is preferable that the particle size of the metal alloy fine particles is in the range from 1 nm to 50 nm, more preferably in the range from 1 nm to 10 nm, even more preferably in the range from 2 nm to 5 nm. When the particle size is less than 1 nm, the anisotropic energy of individual fine particles becomes close to the heat energy even in the CuAu-I type $L1_0$ ordered phase having a high crystal magnetic anisotropy, and the effect of thermal disturbance is increased, so that sufficient thermal stability for a magnetic recording medium material cannot be obtained. On the other hand, when the particle size exceeds 50 nm, the recording resolution is decreased.

Next, a method for producing the metal alloy fine particles of the present invention will be described more specifically. The metal alloy fine particles expressed by the general formula (1) of the present invention are produced by:

(a) dissolving the following substances in an alcohol alone, water and an alcohol, or an alcohol and an organic solvent that can be mixed with the alcohol in the presence of an organic protective agent:

(i) a salt or a complex of at least one transition metal selected from the group consisting of Fe and Co, and (ii) a salt or a complex of at least one noble metal selected from the group consisting of Pt and Pd (provided that a combination of Co—Pd is excluded); and (b) performing heating under reflux with an alcohol in an inert atmosphere.

Optionally, following the step (b), the step (c) of filtrating the obtained product and heating the product at a temperature in the range from 550 to 600° C. in an inert atmosphere further can be performed. This heat treatment can cause the transition to the CuAu-I type $L1_0$ ordered phase in the binary metal alloy fine particles.

Furthermore, the metal alloy fine particles expressed by the general formula (2), (a) dissolving the following substances in an alcohol alone, water and an alcohol, or an alcohol and an organic solvent that can be mixed with the alcohol in the presence of an organic protective agent:

(i) a salt or a complex of at least one transition metal selected from the group consisting of Fe and Co, (ii) a salt or a complex of at least one noble metal selected from the group consisting of Pt and Pd (provided that a combination of Co—Pd is excluded); and (iii) a salt or a complex of at least one additional element selected from the group consisting of Cu, Bi, Sb, Sn, Pb and Ag; and (b) performing heating under reflux with an alcohol in an inert atmosphere.

Optionally, following the step (b), a step (c) of filtrating the obtained product and heating the product at a temperature of 300 to 500° C. in an inert atmosphere further can be performed. This heat treatment can cause the transition to the CuAu-I type $L1_0$ ordered phase in the metal alloy fine particles expressed by the general formula (2).

Examples of the salt or the complex of Fe used to produce the metal alloy fine particles of the present invention include iron nitrate, iron acetate, an iron ammine complex, an iron ethylene diamine complex, ethylene diamine tetra-acetate iron, tris(acetylacetonato) iron (III), iron (II) lactate trihydrate, iron (II) oxalate dihydrate and iron (III) citrate n-hydrate. These iron compounds can be used alone or in combination of two or more. These iron compounds do not produce harmful carbon monoxide in the process of synthesizing the metal alloy fine particles, and are more inexpensive than the conventionally used iron pentacarbonyl.

Among these, iron nitrate, iron acetate, tris(acetylacetonato), iron (III), iron (II) lactate trihydrate, iron (II) oxalate dihydrate and iron (III) citrate n-hydrate are preferable.

Examples of the salt or the complex of Co used to produce the metal alloy fine particles of the present invention include cobalt nitrate, cobalt acetate, a cobalt ammine complex, a cobalt ethylene diamine complex, ethylene diamine tetra-acetate cobalt, a cobalt (II) acetylacetonato complex and a cobalt (III) acetylacetonato complex. These cobalt compounds can be used alone or in combination of two or more.

The above-mentioned salts and complexes are used as the source of Fe and Co, so that a highly safe and low-cost synthetic system can be produced without producing carbon monoxide that is harmful to the human body in the process of synthesizing the metal alloy fine particles.

Examples of the salt or the complex of Pt used to produce the metal alloy fine particles of the present invention include platinum acetate, platinum nitrate, a platinum ethylene diamine complex, a platinum triphenyl phosphine complex, a platinum ammine complex, and bis(acetylacetonato) platinum (II). These platinum compounds can be used alone or in combination of two or more.

Examples of the salt or the complex of Pd used to produce the metal alloy fine particles of the present invention include palladium acetate, palladium nitrate, a palladium triphenyl phosphine complex, a palladium ammine complex, a palladium ethylene diamine complex and palladium acetylacetonato complex. These palladium compounds can be used alone or in combination of two or more.

Examples of the salts of Cu, Bi, Sb, Sn, Pb and Ag used to produce the metal alloy fine particles of the present invention include sulfates, nitrates, and acetates, and examples of the complexes include ammine complexes, ethylene diamine complexes, cyan complexes, and ethylene diamine tetra-acetate complexes. Among these, the salts or the complexes of Bi, Sb and Pb are preferable.

The organic protective agent used to produce the metal alloy fine particles of the present invention has the important functions of controlling the particle size of the metal alloy fine particles made of the transition metal and the noble metal and dispersing the fine particles. There are lone electron pairs of oxygen or nitrogen in the molecules of the organic protective agent, and therefore the organic protective agent is coordinately bonded weakly to transition metal ions and platinum ions in the reaction system as a polymer multidentate ligand. The ions to which the organic protective agent is coordinately bonded are contacted with an alcohol, which is a reductant, and are reduced to a metal. Furthermore, the organic protective agent is coordinately bonded weakly to the entire surfaces of the metal alloy fine particles made of the transition metal and the noble metal that have been reduced, and magnetically insulates the fine particles from each other by the steric hindrance.

As the organic protective agent in the method for synthesizing the metal alloy fine particles of the present invention, compounds including oxygen or nitrogen atoms having lone electron pairs can be used. More specific examples thereof include amines such as alkanolamine; vinyl polymers having a cyclic amide structure such as polyvinyl pyrrolidone; nonionic polymer such as polyvinyl alcohol; anionic polymer such as polyacrylic acid; sugar based polymer such as cyclodextrin and amino pectin; and cellulose based polymer such as methyl cellulose.

Among these, alkanolamine and vinyl polymer having a cyclic amide structure that can be expressed in the following general formula is used in one preferred embodiment because they serve as a catalyst having a high activity.

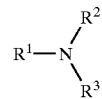

where $R^1$ is an alkyl group having 1 to 4 carbons, $CH_2CH_2OH$ or $CH_2CH(CH_3)OH$, $R^2$ is $(CH_2)nNH_2$ (n is 2 to 3), and $R^3$ is $CH_2CH_2OH$ or $CH_2CH(CH_3)OH$.

As alkanolamine, N-(3-amonopropyl) diethanol amine or the like can be used. As vinyl polymer having a cyclic amide structure, polyvinyl pyrrolidone, especially, poly(N-vinyl-2-pyrrolidone), or the like can be used.

These water-soluble organic protective agents have an ability of protecting and stabilizing metal colloid more than surfactants. Furthermore, alkyl carboxylic acid and alkyl amine having 6 to 18 carbons can be used in an equal amount as the organic protective agent. When the number of carbons is less than 6, the protective effect by the molecular steric hindrance cannot be obtained sufficiently. When the number of carbons is more than 18, the protective effect by the molecular steric hindrance is saturated.

For example, by the method of the present invention, N-(3-aminopropyl) diethanol amine is used as the organic protective agent for producing FePt metal alloy fine particles, tris(acetylacetonato) iron (III) and bis(acetylacetonato) platinum (II); iron (II) lactate trihydrate and bis(acetylacetonato) platinum (II); iron (II) oxalate dihydrate and bis(acetylacetonato) platinum (II); or iron (III) citrate n-hydrate and bis(acetylacetonato) platinum (II) are dissolved in an alcohol alone, water and an alcohol, or an alcohol and an organic solvent that can be mixed with the alcohol, and the mixture is treated by a method of heating under reflux in an inert atmosphere such as nitrogen or Ar. Thus, monodisperse alloy fine particles having a desired particle size in which the metal alloy fine particles such as FePt alloy fine particles do not aggregate each other can be obtained.

It is preferable to use the organic protective agent in an amount more than the stoichiometrically derived amount. The amount of such an organic protective agent used is generally 1 to 15 times, preferably 5 to 15 times larger than those of the transition metal and the noble metal in the molar ratio. When the amount of the organic protective agent used is smaller than their amounts, a desired protective effect cannot be obtained. On the other hand, when the amount of the organic protective agent used is more than 15 times, the targeted protective effect is saturated and uneconomical.

In the synthesis method of the present invention, a method for reducing metal ions by heating under reflux employing an alcohol is used. An alcohol (R—OH) reduces metal ions during heating under reflux, and the alcohol itself is oxidized to aldehyde (R—CHO).

As the alcohol used in the present invention, an alcohol having a high boiling point is preferable because it can be refluxed at a high temperature so that the reduction rate is increased. For example, monohydric alcohols having 2 to 18 carbons, preferably 3 to 8 carbons, or polyhydric alcohols having 2 to 18 carbons, preferably 2 to 4 carbons can be used. The reduction rate can be improved by setting the number of carbons in the above-described range. Specific examples of the alcohol suitable for use include n-propyl alcohol, n-butyl alcohol, sec-butyl alcohol, isobutyl alcohol, n-amyl alcohol, isoamyl alcohol, allyl alcohol, 2-ethoxy ethanol, ethylene glycol, glycerin, propylene glycol and 1,2-hexadecane diol. Among these alcohols, polyhydric alcohols, especially ethylene glycol or propylene glycol, are preferable. These alcohols can be used by selecting one or two or more as appropriate.

In general, an alcohol alone is not sufficient as a reductant of the transition metal because of the magnitude of its oxidization-reduction potential. However, the noble metals having a catalytic action such as Pt and Pd are present in the reaction process. Therefore, it seems that when these noble metals and the transition metal ions coexist and are heated under reflux at a boiling point of the alcohol, the transition metals such as Fe and Co also are reduced and precipitated at the same time, and thus metal alloy fine particles made of the transition metals and the noble metals can be produced. Furthermore, an alcohol having a low boiling point such as ethyl alcohol can be used, as long as it is refluxed under pressure (autoclave method).

The heating temperature and the reflux time in the treatment of heating under reflux depend on the type of the alcohol used. However, in general, the heating temperature is in the range of 190° C. to 300° C., and the reflux time is; in the range from 30 minutes to 6 hours. The end point of the reaction can be detected by the fact that the color of the solution is changed to black. When it is detected that all the transition metal ions and the noble metal ions, which are the starting materials, are reduced, the treatment of heating under reflux is stopped.

As the solvent suitable to dissolve the salts or the complexes of Pt or Pd, an alcohol alone, a mixed solvent of water and an alcohol, or a mixed solvent of an alcohol and an organic solvent that can be mixed with the alcohol can be used. Examples of these organic solvents include ether, dioxane, tetrahydrofuran, N-methylpyrrolidone, and acetone. For the alcohol, the same alcohols as used in the treatment of heating under reflux can be used, but among these, polyhydric alcohols, especially, ethylene glycol and propylene glycol are preferable. When using a mixed solvent, the ratio of water and an organic solvent mixed with the alcohol can be set to an arbitrary ratio, as long as it does not affect the reducing action of the alcohol. As the solvent in which the salts or the complexes of the noble metal are to be dissolved, it is preferable to use the same types of alcohols as used in the treatment of heating under reflux, but different alcohols also can be used.

It is preferable to use the solvent in an amount 1,000 to 5,000 times, preferably 2,000 to 4,000 times, and more preferably 2,500 to 3,000 times larger than the salts or complexes of Pt or Pd in the molar ratio.

As the solvent suitable to dissolve the salts or the complexes of Fe or Co, the same types of solvents as used to dissolve the salts or the complexes of the noble metal can be used. In particular, primary alcohols or secondary alcohols are preferable. For example, n-propyl alcohol, n-butyl alcohol, sec-butyl alcohol, isobutyl alcohol, n-amyl alcohol, isoamyl alcohol, allyl alcohol, 2-ethoxy ethanol, ethylene glycol, glycerin, propylene glycol and 1,2-hexadecane diol. Among these alcohols, polyhydric alcohols, especially ethylene glycol or propylene glycol, are preferable. As the solvent in which the salts or the complexes of Fe or Co are to be dissolved, it is preferable to use the same types of alcohols as used in the treatment of heating under reflux, but different alcohols also can be used.

It is preferable to use the solvent in an amount 1,000 to 5,000 times, preferably 2,000 to 4,000 times, and more preferably 2,500 to 3,000 times larger than the salts or complexes of Fe or Co in the molar ratio.

The metal fine particles made of the transition metal and the noble metal of the present invention are synthesized in an inert atmosphere in which an inert gas such as nitrogen or Ar is flowing in a reaction system in order to prevent the fine particles from being oxidized and remove water and a byproduct during the synthesis.

In order to cause a transition to the CuAu-I type $L1_0$ ordered phase in the binary metal alloy fine particles expressed by the general formula (1) or the ternary metal alloy fine particles expressed by the general formula (2) synthesized by the method of the present invention to provide a large crystal magnetic anisotropy, the metal alloy fine particles are subjected to a heat treatment in an atmosphere of nitrogen, Ar or the like while keeping an oxygen concentration of 5 ppm or less. The oxygen concentration is larger than 5 ppm, the metal alloy fine particles are oxidized during the heat treatment. Therefore, it is most preferable that the oxygen concentration is zero.

It is preferable to perform this heat treatment at a temperature of 550° C. to 600° C. in the case of the binary metal alloy fine particles expressed by the general formula (1). When the heat treatment temperature is less than 550° C., a complete transition to the CuAu-I type $L1_0$ ordered phase may not be achieved in the metal alloy fine particles. On the other hand, the heat treatment temperature exceeds 600° C., sintering occurs among the metal alloy fine particles, and the particle size of the fine particles becomes larger than 50 nm, and the recording resolution is reduced.

It is preferable to perform the heat treatment at a temperature of 300° C. to 500° C. in the case of the ternary metal alloy fine particles expressed by the general formula (2). When the heat treatment temperature is less than 300° C., at least one additional element selected from the group consisting of Cu, Bi, Sb, Sn, Pb and Ag is diffused on the surfaces of the fine particles, and it is difficult to generate vacancies in the internal portion of the alloy fine particles. As a result, a phase transition to the CuAu-I type $L1_0$ ordered phase is not promoted. On the other hand, when the heat treatment temperature exceeds 500° C., the phase transition to the CuAu-I type $L1_0$ ordered phase occurs, but a high heat-resistant substrate is necessary, which leads to high cost. Since those problems arise, these temperatures are not preferable.

The heat treatment is performed until the phase transition is completed at the heating temperature used. This period of time is generally in the range from 30 minutes to one hour. When the heating time is less than 30 minutes, sufficient phase transition may not occur. On the other hand, when the heating time exceeds one hour, the phase transition is saturated, which not only is uneconomical but also may cause an adverse effect such as distortion by heating on the non-magnetic substrate material.

The phase transition to the CuAu-I type $L1_0$ ordered phase in the binary metal alloy fine particles or the ternary metal alloy fine particles expressed by the general formula (1) or the general formula (2) by the heat treatment can be confirmed by X-ray diffraction. If diffraction peaks from (001), (110), (111), (200), (002), (201), (112), (220), (202), (221), (130), (311), (113), (222), (203), and (312) planes based on the phase transition to the CuAu-I type $L1_0$ ordered phase are observed after the heat treatment, this is the confirmation that the phase transition to the CuAu-I type $L1_0$ ordered phase is caused.

The binary metal alloy fine particles or the ternary metal alloy fine particles expressed by the general formula (1) or the general formula (2) synthesized by the method of the present invention are magnetically insulated even after the heat treatment. The insulating material seems to be a product resulting from carbonization of the organic protective agent by the heat treatment. These carbonized substances prevent sintering in the fine particles and maintain a particle size of 1 to 50 nm.

When the binary or the ternary metal alloy fine particles synthesized by the method of the present invention are used, for example, in a magnetic disk, the obtained metal alloy fine particles are dissolved in alcohols such as methyl alcohol, ethyl alcohol, and isopropyl alcohol, or ketones such as acetone, methyl ethyl ketone, methyl isobutyl ketone, and applied onto a non-magnetic heat-resistant substrate to a thickness of 2 to 100 nm by dip-coating. Thereafter, a heat treatment is performed in an inert gas atmosphere such as nitrogen or Ar at an oxygen concentration of less than 5 ppm at a temperature of 550° C. to 600° C. for the binary metal alloy fine particles or 300° C. to 500° C. for the ternary metal alloy fine particles. The heat treatment time depends on the temperature used, but in general is in the range from 30 minutes to one hour. Furthermore, in order to improve the friction and abrasion characteristics, a protective film including carbon and a perfluoropolyether based liquid lubricant layer having a functional group on its end are provided on the uppermost surface of the disk. The minimum thickness of the metal alloy fine particles having the $CuAu-I$ type $L1_0$ ordered phase that is applied is 1 nm, because the particle size is 1 to 50 nm. If application is performed so as to form a multilayer, the thickness can be increased, but in view of the recording demagnetization, the maximum thickness preferably is 100 nm.

Next, synthesis examples of the metal alloy fine particles of the present invention will be described more specifically by way of examples and comparative examples. However, the present invention is not limited to these examples.

EXAMPLE 1

0.62 millimoles of tris(acetylacetonato) iron (III) and 0.62 millimoles of bis(acetylacetonato) platinum (II) were dissolved each in 100 ml of ethylene glycol and then added to 100 ml of an ethylene glycol solution in which 2 g of polyvinyl pyrrolidone (Mw: 40000, which also applies to the following) were dissolved. This solution was refluxed in a nitrogen atmosphere for three hours while being stirred at 197° C.

In the following examples and comparative examples, the reflux time was three hours.

EXAMPLE 2

0.62 millimoles of tris(acetylacetonato) iron (III) and 0.62 millimoles of bis(acetylacetonato) palladium (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 3

0.62 millimoles of a hexaammine iron (III) complex salt and 0.62 millimoles of bis(acetylacetonato) platinum (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 4

0.62 millimoles of a hexaammine iron (III) complex salt and 0.62 millimoles of bis(acetylacetonato) palladium (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 5

0.62 millimoles of an iron (III)-EDTA complex and 0.62 millimoles of bis(acetylacetonato) platinum (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 6

0.62 millimoles of an iron (III)-EDTA complex and 0.62 millimoles of bis(acetylacetonato) palladium (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 7

0.62 millimoles of iron (III) acetate and 0.62 millimoles of bis(acetylacetonato) platinum (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 8

0.62 millimoles of iron (III) acetate and 0.62 millimoles of bis(acetylacetonato) palladium (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 9

0.62 millimoles of iron (III) nitrate nonahydrate and 0.62 millimoles of bis(acetylacetonato) platinum (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 10

0.62 millimoles of iron (III) nitrate nonahydrate and 0.62 millimoles of bis(acetylacetonato) palladium (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 11

0.62 millimoles of tris(acetylacetonato) cobalt (III) and 0.62 millimoles of bis(acetylacetonato) platinum (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 12

0.62 millimoles of bis(acetylacetonato) diaqua cobalt (II) and 0.62 millimoles of bis(acetylacetonato) platinum (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 13

0.62 millimoles of hexaammine cobalt (II) salt and 0.62 millimoles of bis(acetylacetonato) platinum (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 14

0.62 millimoles of a cobalt (II)-EDTA complex and 0.62 millimoles of bis(acetylacetonato) platinum (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 15

0.62 millimoles of cobalt (II) acetate and 0.62 millimoles of bis(acetylacetonato) platinum (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 16

0.62 millimoles of cobalt (II) nitrate hexahydrate and 0.62 millimoles of bis(acetylacetonato) platinum (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 17

0.62 millimoles of tris(acetylacetonato) iron (III) and 0.62 millimoles of bis(acetylacetonato) platinum (II) were dissolved each in 100 ml of glycerin and then added to 100 ml of a glycerin solution in which 2 g of polyvinyl pyrrolidone were dissolved. This solution was refluxed in a nitrogen atmosphere while being stirred at 297° C.

EXAMPLE 18

0.62 millimoles of tris(acetylacetonato) iron (III) and 0.62 millimoles of bis(acetylacetonato) platinum (II) were dissolved each in 100 ml of ethylene glycol and then added to 100 ml of an ethylene glycol solution in which 2.9 g of N-(3-aminopropyl) diethanol amine were dissolved. This solution was refluxed in a nitrogen atmosphere while being stirred at 197° C.

EXAMPLE 19

0.62 millimoles of iron (II) lactate trihydrate and 0.62 millimoles of bis(acetylacetonato) platinum (II) were dissolved each in 100 ml of ethylene glycol and then added to 100 ml of an ethylene glycol solution in which 2.9 g of N-(3-aminopropyl) diethanol amine were dissolved. This solution was refluxed in a nitrogen atmosphere while being stirred at 197° C.

EXAMPLE 20

0.62 millimoles of iron (II) oxalate dihydrate and 0.62 millimoles of bis(acetylacetonato) platinum (II) were dissolved each in 100 ml of ethylene glycol and then added to 100 ml of an ethylene glycol solution in which 2.9 g of N-(3-aminopropyl) diethanol amine were dissolved. This solution was refluxed in a nitrogen atmosphere while being stirred at 197° C.

EXAMPLE 21

0.62 millimoles of iron (III) citrate n-hydrate and 0.62 millimoles of bis(acetylacetonato) platinum (II) were dissolved each in 100 ml of ethylene glycol and then added to 100 ml of an ethylene glycol solution in which 2.9 g of N-(3-aminopropyl) diethanol amine were dissolved. This solution was refluxed in a nitrogen atmosphere while being stirred at 197° C.

EXAMPLE 22

0.62 millimoles of iron (III) nitrate nonahydrate and 0.62 millimoles of bis(acetylacetonato) platinum (II) were dissolved each in 100 ml of ethylene glycol and then added to 100 ml of an ethylene glycol solution in which 2.9 g of N-(3-aminopropyl) diethanol amine were dissolved. This solution was refluxed in a nitrogen atmosphere while being stirred at 197° C.

EXAMPLE 23

0.62 millimoles of iron (II) lactate trihydrate and 0.62 millimoles of bis(acetylacetonato) platinum (II) were dissolved each in 100 ml of ethylene glycol and then added to 100 ml of an ethylene glycol solution in which 2 g of polyvinyl pyrrolidone were dissolved. This solution was reflexed in a nitrogen atmosphere while being stirred at 197° C.

EXAMPLE 24

0.62 millimoles of iron (II) oxalate dihydrate and 0.62 millimoles of bis(acetylacetonato) platinum (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 25

0.62 millimoles of iron (III) citrate n-hydrate and 0.62 millimoles of bis(acetylacetonato) platinum (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

Comparative Example 1

0.62 millimoles of iron (II) sulfate heptahydrate and 0.62 millimoles of hexachloroplatinic (IV) acid hexahydrate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

Compartive Example 2

0.62 millimoles of iron (II) sulfate heptahydrate and 0.62 millimoles of hexachloroplatinic (IV) acid hexahydrate were dissolved each in 100 ml of ethylene glycol and then added to 100 ml of an ethylene glycol solution in which 2 g of polyvinyl pyrrolidone were dissolved. Then, 1 mol/L of a sodium hydroxide aqueous solution was dripped into this solution in a nitrogen atmosphere and the pH of the bath was adjusted to 11.5. Thereafter, the solution was reflexed while being stirred at 197° C.

Comparative Example 3

0.62 millimoles of iron (II) sulfate heptahydrate and 0.62 millimoles of potassium tetrachloroplatinate (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

Comparative Example 4

0.62 millimoles of iron (II) sulfate heptahydrate and 0.62 millimoles of potassium tetrachloroplatinate (II) were dissolved each in 100 ml of ethylene glycol and then added to 100 ml of an ethylene glycol solution in which 2 g of polyvinyl pyrrolidone were dissolved. Then, 1 mol/L of a sodium hydroxide aqueous solution was dripped into this solution in a nitrogen atmosphere and the pH of the bath was adjusted to 11.5. Thereafter, the solution was refluxed while being stirred at 197° C.

Comparative Example 5

0.62 millimoles of iron (II) sulfate heptahydrate and 0.62 millimoles of bis(acetylacetonato) platinum (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

Comparative Example 6

0.62 millimoles of cobalt (II) sulfate heptahydrate and 0.62 millimoles of hexachloroplatinic (IV) acid hexahydrate were dissolved each in 100 ml of ethylene glycol and then added to 100 ml of an ethylene glycol solution in which 2 g of polyvinyl pyrrolidone were dissolved. Then, 1 mol/L of a sodium hydroxide aqueous solution was dripped into this solution in a nitrogen atmosphere and the pH of the bath was adjusted to 11.5. Thereafter, the solution was refluxed while being stirred at 197° C.

Comparative Example 7

0.62 millimoles of cobalt (II) sulfate heptahydrate and 0.62 millimoles of potassium tetrachloroplatinate (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

Comparative Example 8

0.83 millimoles of cobalt (II) sulfate heptahydrate and 041 millimoles of potassium tetrachloroplatinate (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

Comparative Example 9

0.93 millimoles of cobalt (II) sulfate heptahydrate and 0.31 millimoles of potassium tetrachloroplatinate (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

Comparative Example 10

0.41 millimoles of cobalt (II) sulfate heptahydrate and 0.83 millimoles of potassium tetrachloroplatinate (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

Comparative Example 11

0.62 millimoles of cobalt (II) sulfate heptahydrate and 0.62 millimoles of potassium tetrachloroplatinate (II) were dissolved each in 100 ml of ethylene glycol and then added to 100 ml of an ethylene glycol solution in which 2 g of polyvinyl pyrrolidone were dissolved. Then, 1 mol/L of a sodium hydroxide aqueous solution was dripped into this solution in a nitrogen atmosphere and the pH of the bath was adjusted to 11.5. Thereafter, the solution was refluxed while being stirred at 197° C.

Comparative Example 12

0.62 millimoles of iron (III) chloride hexahydrate and 0.62 millimoles of bis(acetylacetonato) platinum (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

Comparative Example 13

0.62 millimoles of iron (III) chloride hexahydrate and 0.62 millimoles of hexachloroplatinic (IV) acid hexahydrate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

Comparative Example 14

0.62 millimoles of ammonium sulfate iron (II) hexahydrate and 0.62 millimoles of bis(acetylacetonato) platinum (II) were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

Comparative Example 15

0.62 millimoles of ammonium sulfate iron (II) hexahydrate and 0.62 millimoles of hexachloroplatinic (IV) acid hexahydrate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

Comparative Example 16

0.62 millimoles of iron (III) nitrate nonahydrate and 0.62 millimoles of hexachloroplatinic (IV) acid hexahydrate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

Comparative Example 17

0.62 millimoles of tris(acetylacetonato) iron (III) and 0.62 millimoles of hexachloroplatinic (IV) acid hexahydrate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

The metal alloy fine particles obtained in Examples 1 to 25 and Comparative Examples 1 to 17 were filtrated, and the particle size and the composition thereof were measured with a transmission electron microscope (field emission electron microscope HF-2200 model manufactured by Hitachi Ltd.) provided with an energy filter at an accelerating voltage of 200 kV and a magnification of $10^G$. Furthermore, the temperature of the transition to the CuAu-I type $L1_0$ ordered phase in the fine particles obtained in Examples 1, 2 and 11 was investigated with a X-ray diffraction apparatus (RINT1500 manufactured by Rigaku Corporation) in a nitrogen atmosphere. Table 1 shows the results collectively.

TABLE 1

| sample | particle size range (nm) | composition | ordered phase transition starting temperature (° C.) |
|---|---|---|---|
| Ex. 1 | 2–3 | $Fe_{45}Pt_{55}$ | 550 |
| Ex. 2 | 2–4 | $Fe_{42}Pd_{58}$ | 560 |
| Ex. 3 | 2–3 | $Fe_{55}Pt_{46}$ | — |
| Ex. 4 | 2–4 | $Fe_{45}Pd_{55}$ | — |
| Ex. 5 | 2–5 | $Fe_{43}Pt_{57}$ | — |
| Ex. 6 | 2–3 | $Fe_{52}Pd_{48}$ | — |
| Ex. 7 | 2–3 | $Fe_{47}Pt_{53}$ | — |
| Ex. 8 | 2–3 | $Fe_{48}Pd_{54}$ | — |
| Ex. 9 | 2–5 | $Fe_{56}Pt_{44}$ | — |
| Ex. 10 | 2–5 | $Fe_{56}Pd_{44}$ | — |
| Ex. 11 | 2–4 | $Co_{56}Pt_{44}$ | 560 |
| Ex. 12 | 2–3 | $Co_{52}Pt_{48}$ | — |
| Ex. 13 | 2–3 | $Co_{51}Pt_{49}$ | — |
| Ex. 14 | 2–4 | $Co_{55}Pt_{45}$ | — |
| Ex. 15 | 2–3 | $Co_{48}Pt_{52}$ | — |
| Ex. 16 | 2–5 | $Co_{43}Pt_{57}$ | — |
| Ex. 17 | 2–3 | $Fe_{49}Pt_{51}$ | — |
| Ex. 18 | 2–5 | $Fe_{49}Pt_{51}$ | — |
| Ex. 19 | 2–5 | $Fe_{49}Pt_{51}$ | — |
| Ex. 20 | 2–5 | $Fe_{48}Pt_{52}$ | — |
| Ex. 21 | 2–5 | $Fe_{50}Pt_{50}$ | — |
| Ex. 22 | 2–5 | $Fe_{49}Pt_{51}$ | — |
| Ex. 23 | 2–5 | $Fe_{47}Pt_{53}$ | — |
| Ex. 24 | 2–5 | $Fe_{49}Pt_{51}$ | — |
| Ex. 25 | 2–5 | $Fe_{60}Pt_{50}$ | — |
| Com. Ex. 1 | 2–4 | $Fe_{15}Pt_{85}$ | — |
| Com. Ex. 2 | 1–1.5 | $Fe_{58}Pt_{81}$ | — |
| Com. Ex. 3 | 2–4 | $Fe_{15}Pt_{85}$ | — |
| Com. Ex. 4 | –1 | —* | — |
| Com. Ex. 5 | 3–4 | $Fe_{33}Pt_{77}$ | — |
| Com. Ex. 6 | –1 | —* | — |
| Com. Ex. 7 | 2–3 | $Co_{10}Pt_{90}$ | — |
| Com. Ex. 8 | 2–4 | $Co_{12}Pt_{88}$ | — |
| Com. Ex. 9 | 1.5–3 | $Co_{10}Pt_{90}$ | — |
| Com. Ex. 10 | 2–3.5 | $Co_{19}Pt_{91}$ | — |
| Com. Ex. 11 | –1 | —* | — |
| Com. Ex. 12 | –4 | $Fe_{15}Pt_{85}$ | — |
| Com. Ex. 13 | 3–4 | $Fe_{15}Pt_{85}$ | — |
| Com. Ex. 14 | 2–3 | $Fe_{10}Pt_{90}$ | — |
| Com. Ex. 15 | 2–3 | $Fe_{15}Pt_{85}$ | — |
| Com. Ex. 16 | 2–3 | $Fe_{15}Pt_{85}$ | — |
| Com. Ex. 17 | 2–3 | $Fe_{25}Pt_{76}$ | — |

Note:
*The particle size was small so that it was impossible to measure the composition with the electron microscope.

The results shown in Table 1 indicate that the particle size of the samples obtained in Examples 1 to 25 is 2 to 5 nm, and the compositions of Fe and Co are in the range from 40 to 60 at %.

The fine particles obtained in Examples 1 to 25 and Comparative Examples 1 to 17 were subjected to a heat treatment at 580° C. in a nitrogen stream for 30 minutes. In the samples of Examples 1 to 25, the phase transition to the $L1_0$ phase was observed by X-ray diffraction, but in the samples in Comparative Examples 1 to 17, the transition to the $L1_0$ phase was not observed.

The coercive force of the metal alloy fine particles that had been subjected to the heat treatment in a nitrogen stream was measured with a vibrating sample magnetometer. In the samples of Examples 1 to 25, the coercive force was 5400 to 9000 oersted (Oe), whereas in the samples of Comparative Examples 1 to 17, no coercive force was observed.

EXAMPLE 26

0.62 millimoles of an iron (III) acetylacetonato complex, 0.62 millimoles of a platinum (II) acetylacetonato complex and 0.10 millimoles of antimony nitrate were dissolved each in 100 ml of ethylene glycol and then added to 100 ml of an ethylene glycol solution in which 2 g of polyvinyl pyrrolidone (Mw: 40000, which also applies to the following) were dissolved. This solution was refluxed in a nitrogen atmosphere for three hours while being stirred at 197° C.

In the following examples and comparative examples, the reflux time was three hours.

EXAMPLE 27

0.62 millimoles of an iron (III) acetylacetonato complex, 0.62 millimoles of a platinum (II) acetylacetonato complex and 0.10 millimoles of bismuth nitrate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 28

0.62 millimoles of an iron (III) acetylacetonato complex, 0.62 millimoles of a platinum (II) acetylacetonato complex and 0.10 millimoles of tin nitrate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 29

0.62 millimoles of an iron (III) acetylacetonato complex, 0.62 millimoles of a platinum (II) acetylacetonato complex and 0.10 millimoles of lead nitrate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 30

0.62 millimoles of an iron (II) acetylacetonato complex, 0.62 millimoles of a platinum (II) acetylacetonato complex and 0.10 millimoles of silver nitrate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 31

0.62 millimoles of an iron (III) acetylacetonato complex, 0.62 millimoles of a palladium (II) acetylacetonato complex and 0.10 millimoles of antimony nitrate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 32

0.62 millimoles of an iron (III) acetylacetonato complex, 0.62 millimoles of a palladium (II) acetylacetonato complex and 0.10 millimoles of bismuth nitrate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 33

0.62 millimoles of an iron (III) acetylacetonato complex, 0.62 millimoles of a palladium (II) acetylacetonato complex and 0.10 millimoles of tin nitrate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 34

0.62 millimoles of an iron (III) acetylacetonato complex, 0.62 millimoles of a palladium (II) acetylacetonato complex and 0.10 millimoles of lead nitrate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 35

0.62 millimoles of an iron (III) acetylacetonato complex, 0.62 millimoles of a palladium (II) acetylacetonato complex and 0.10 millimoles of silver nitrate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 36

0.62 millimoles of a cobalt (III) acetylacetonato complex, 0.62 millimoles of a platinum (II) acetylacetonato complex and 0.10 millimoles of antimony nitrate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 37

0.62 millimoles of a cobalt (III) acetylacetonato complex, 0.62 millimoles of a platinum (II) acetylacetonato complex and 0.10 millimoles of bismuth nitrate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 38

0.62 millimoles of a cobalt (III) acetylacetonato complex, 0.62 millimoles of a platinum (II) acetylacetonato complex and 0.10 millimoles of tin nitrate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 39

0.62 millimoles of a cobalt (III) acetylacetonato complex, 0.62 millimoles of a platinum (II) acetylacetonato complex and 0.10 millimoles of lead nitrate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 40

0.62 millimoles of a cobalt (III) acetylacetonato complex, 0.62 millimoles of a platinum (II) acetylacetonato complex and 0.10 millimoles of silver nitrate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 41

0.62 millimoles of an iron (III) acetylacetonato complex, 0.62 millimoles of a platinum (II) acetylacetonato complex and 0.10 millimoles of copper (II) sulfate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 42

0.62 millimoles of an iron (III) acetylacetonato complex, 0.62 millimoles of a platinum (II) acetylacetonato complex and 0.10 millimoles of copper (II) acetylacetonato were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 43

0.62 millimoles of an iron (III) acetylacetonato complex, 0.62 millimoles of a platinum (II) acetylacetonato complex and 0.10 millimoles of copper (II) acetate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 44

0.62 millimoles of an iron (III) acetylacetonato complex, 0.62 millimoles of a platinum (II) acetylacetonato complex and 0.10 millimoles of copper (II) nitrate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 45

0.62 millimoles of an iron (III) acetylacetonato complex, 0.62 millimoles of a platinum (II) acetylacetonato complex and 0.10 millimoles of copper (II) chloride were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 46

0.62 millimoles of an iron (III) acetylacetonato complex, 0.62 millimoles of a palladium (II) acetylacetonato complex and 0.10 millimoles of copper (II) sulfate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 47

0.62 millimoles of an iron (III) acetylacetonato complex, 0.62 millimoles of a palladium (II) acetylacetonato complex and 0.10 millimoles of copper (II) acetylacetonato were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 48

0.62 millimoles of an iron (III) acetylacetonato complex, 0.62 millimoles of a palladium (II) acetylacetonato complex and 0.10 millimoles of copper (II) acetate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 49

0.62 millimoles of an iron (III) acetylacetonato complex, 0.62 millimoles of a palladium (II) acetylacetonato complex and 0.10 millimoles of copper (II) nitrate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 50

0.62 millimoles of an iron (III) acetylacetonato complex, 0.62 millimoles of a palladium (II) acetylacetonato complex and 0.10 millimoles of copper (II) chloride were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 51

0.62 millimoles of a cobalt (III) acetylacetonato complex, 0.62 millimoles of a platinum (II) acetylacetonato complex and 0.10 millimoles of copper (II) sulfate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 52

0.62 millimoles of a cobalt (III) acetylacetonato complex, 0.62 millimoles of a platinum (II) acetylacetonato complex and 0.10 millimoles of copper (II) acetylacetonato were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 53

0.62 millimoles of a cobalt (III) acetylacetonato complex, 0.62 millimoles of a platinum (II) acetylacetonato complex and 0.10 millimoles of copper (II) acetate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 54

0.62 millimoles of a cobalt (III) acetylacetonato complex, 0.62 millimoles of a platinum (II) acetylacetonato complex and 0.10 millimoles of copper (II) nitrate were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

EXAMPLE 55

0.62 millimoles of a cobalt (III) acetylacetonato complex, 0.62 millimoles of a platinum (II) acetylacetonato complex and 0.10 millimoles of copper (II) chloride were dissolved each in 100 ml of ethylene glycol and then added to 100 ml of an ethylene glycol solution in which 2 g of polyvinyl pyrrolidone were dissolved. This solution was refluxed in a nitrogen atmosphere while being stirred at 197° C.

The metal alloy fine particles obtained in Examples 26 to 55 were filtrated, and the particle size and the composition thereof were measured with a transmission electron microscope (field emission electron microscope HF-2200 model manufactured by Hitachi Ltd.) provided with an energy filter at an accelerating voltage of 200 kV and a magnification of $10^6$. Furthermore, the temperature of the transition to the CuAu-I type $L1_0$ ordered phase was investigated with a X-ray diffraction apparatus (RINT1500 manufactured by Rigaku Corporation) in a nitrogen atmosphere. Table 2 shows the results collectively.

TABLE 2

| sample | particle size range (nm) | composition | ordered phase transition starting temperature(° C.) |
|---|---|---|---|
| Ex. 26 | 2–5 | $Fe_{40}Pt_{45}Sb_{15}$ | 400 |
| Ex. 27 | 2–5 | $Fe_{39}Pt_{46}Bi_{15}$ | 420 |
| Ex. 28 | 2–5 | $Fe_{40}Pt_{45}Sn_{15}$ | 415 |
| Ex. 29 | 2–5 | $Fe_{39}Pt_{46}Pb_{15}$ | 410 |
| Ex. 30 | 2–5 | $Fe_{40}Pt_{44}Ag_{16}$ | 410 |
| Ex. 31 | 2–5 | $Fe_{43}Pd_{42}Sb_{15}$ | 400 |
| Ex. 32 | 2–5 | $Fe_{42}Pd_{48}Bi_{15}$ | 420 |
| Ex. 33 | 2–5 | $Fe_{41}Pd_{44}Sn_{15}$ | 415 |
| Ex. 34 | 2–5 | $Fe_{41}Pd_{44}Pb_{15}$ | 410 |
| Ex. 35 | 2–5 | $Fe_{42}Pd_{45}Ag_{15}$ | 410 |
| Ex. 36 | 2–5 | $Co_{40}Pt_{45}Sb_{15}$ | 400 |
| Ex. 37 | 2–5 | $Co_{39}Pt_{46}Bi_{15}$ | 410 |
| Ex. 38 | 2–5 | $Co_{40}Pt_{45}Sn_{15}$ | 400 |
| Ex. 39 | 2–5 | $Co_{39}Pt_{46}Pb_{15}$ | 420 |
| Ex. 40 | 2–5 | $Co_{40}Pt_{45}Ag_{15}$ | 415 |
| Ex. 41 | 2–5 | $Fe_{40}Pt_{45}Cu_{15}$ | 320 |
| Ex. 42 | 2–5 | $Fe_{39}Pt_{46}Cu_{15}$ | 320 |
| Ex. 43 | 2–5 | $Fe_{40}Pt_{45}Cu_{15}$ | 315 |
| Ex. 44 | 2–5 | $Fe_{39}Pt_{46}Cu_{15}$ | 310 |
| Ex. 45 | 2–5 | $Fe_{40}Pt_{44}Cu_{16}$ | 310 |
| Ex. 46 | 2–5 | $Fe_{43}Pd_{42}Cu_{15}$ | 300 |
| Ex. 47 | 2–5 | $Fe_{43}Pd_{48}Cu_{15}$ | 320 |
| Ex. 48 | 2–5 | $Fe_{41}Pd_{44}Cu_{15}$ | 315 |
| Ex. 49 | 2–5 | $Fe_{41}Pd_{44}Cu_{15}$ | 310 |
| Ex. 50 | 2–5 | $Fe_{43}Pd_{43}Cu_{15}$ | 310 |
| Ex. 51 | 2–5 | $Co_{40}Pt_{45}Cu_{15}$ | 300 |
| Ex. 52 | 2–5 | $Co_{39}Pt_{46}Cu_{15}$ | 310 |
| Ex. 53 | 2–5 | $Co_{40}Pt_{45}Cu_{15}$ | 300 |
| Ex. 54 | 2–5 | $Co_{39}Pt_{46}Cu_{15}$ | 320 |
| Ex. 55 | 2–5 | $Co_{40}Pt_{45}Cu_{15}$ | 315 |

As seen in the results shown in Table 2, the particle size of the ternary metal alloy fine particles of the present invention is 2 to 5 nm, and the temperature of the phase transition to the CuAu-I type $L1_0$ ordered phase is at least 100° C. lower than that of the binary metal alloy fine particles of the present invention that do not contain an additional element.

EXAMPLE 56

0.62 millimoles of an iron (III) acetylacetonato complex and 0.62 millimoles of a platinum (II) acetylacetonato complex were dissolved each in 100 ml of ethylene glycol and then added to 100 ml of an ethylene glycol solution in which 2 g of polyvinyl pyrrolidone were dissolved. Thereafter, antimony nitrate with varied amounts was added to the ethylene glycol solution. This solution was refluxed in a nitrogen atmosphere while being stirred at 197° C.

EXAMPLE 57

0.62 millimoles of an iron (III) acetylacetonato complex and 0.62 millimoles of a platinum (II) acetylacetonato complex were dissolved each in 100 ml of ethylene glycol and then added to 100 ml of an ethylene glycol solution in which 2 g of polyvinyl pyrrolidone were dissolved. Thereafter, copper (II) acetylacetonato with varied amounts was added to the ethylene glycol solution. This solution was refluxed in a nitrogen atmosphere while being stirred at 197° C.

The metal alloy fine particles obtained in Examples 56 to 57 were filtrated, and the particle size and the composition thereof were measured with a high resolution electron microscope. Furthermore, the temperature of the phase transition to the CuAu-I type $L1_0$ ordered phase was investigated with a X-ray diffraction apparatus in a nitrogen atmosphere. Tables 3 and 4 show the results collectively.

TABLE 3

| amount of antimony nitrate added (millimole) | particle size range (nm) | composition | phase transition temperature (° C.) |
|---|---|---|---|
| 0.00 | 2–5 | $Fe_{49}Pt_{51}$ | 550 |
| 0.02 | 2–5 | $Fe_{48}Pd_{50}Sb_2$ | 450 |
| 0.04 | 2–5 | $Fe_{45}Pd_{50}Sb_5$ | 420 |
| 0.10 | 2–5 | $Fe_{40}Pt_{45}Sb_{15}$ | 400 |
| 0.13 | 2–5 | $Fe_{38}Pt_{39}Sb_{23}$ | 390 |
| 0.16 | 2–5 | $Fe_{34}Pt_{36}Sb_{30}$ | 350 |
| 0.20 | 2–5 | $Fe_{30}Pt_{32}Sb_{38}$ | 350 |

TABLE 4

| amount of copper(II) acetylacetonato added (millimole) | particle size range (nm) | composition | phase transition temperature (° C.) |
|---|---|---|---|
| 0.00 | 2–5 | $Fe_{49}Pt_{51}$ | 550 |
| 0.04 | 2–5 | $Fe_{45}Pd_{50}Cu_5$ | 380 |
| 0.10 | 2–5 | $Fe_{40}Pt_{45}Cu_{15}$ | 320 |
| 0.13 | 2–5 | $Fe_{38}Pt_{39}Cu_{23}$ | 315 |
| 0.16 | 2–5 | $Fe_{34}Pt_{36}Cu_{30}$ | 310 |
| 0.20 | 2–5 | $Fe_{30}Pt_{32}Cu_{38}$ | 310 |

As seen from the results shown in Tables 3 and 4, when the composition of antimony or copper is in the range from 2 to 30 at %, the temperature of the transition to the CuAu-I type $L1_0$ ordered phase is decreased, and the effect of adding the element is saturated in a region in which the composition exceeds 30 at %.

The metal alloy fine particles obtained in Examples 26 to 55 were dissolved in methyl isobutyl ketone and applied onto a 2.5 inch glass substrate to a thickness of 12 nm by dip coating and then were subjected to a heat treatment at 450° C. for 30 minutes. Then, a carbon protective film having a thickness of 10 nm was formed by sputtering. Thereafter, a perfluoropolyether based liquid lubricant Fomblin-Z-DOL having an average molecular weight of 4000 and having hydroxyl groups at both the ends of a molecule was applied to a thickness of 1.5 nm onto the carbon protective film by dip coating. The coercive force in the in-plane direction of each of the obtained disks was measured with a vibrating sample magnetometer, and the results were 5400 to 6500 Oe.

Industrial Applicability

As described above, according to the present invention, when synthesizing metal alloy fine particles made of a transition metal and a noble metal by a reducing method employing heating under reflux with an alcohol, a highly safe and low cost synthetic system can be produced without generating carbon monoxide, which is harmful to the human body, during the synthesis, by using as a source of the transition metal and the noble metal a salt or a complex thereof. Furthermore, the temperature of the phase transition to the CuAu-I type $L1_0$ ordered phase can be reduced by 100° C. or more from the conventional temperature by adding at least one element selected from the group consisting of Cu, Bi, Sb, Sn, Pb and Ag in a ratio of 2 to 30 at %.

What is claimed is:

1. A method for producing metal alloy fine particles comprising:

(a) dissolving the following substances in an alcohol alone, water and an alcohol, or an alcohol and an organic solvent that can be mixed with the alcohol in a presence of an organic protective agent:
(i) a salt or a complex of at least one transition metal selected from the group consisting of Fe and Co, and
(ii) a salt or a complex of at least one noble metal selected from the group consisting of Pt and Pd (provided that a combination of Co—Pd is excluded); and
(b) performing heating under reflux with an alcohol in an inert atmosphere so as to produce metal alloy fine particles having a composition expressed by a general formula:

$$A_xB_{(1-x)}$$

(where A is at least one selected from the group consisting of Fe and Co, and B at least one selected from the group consisting of Pt and Pd (provided that a combination of Co—Pd is excluded), and 40 at % $\leq x \leq 60$ at %), and having a particle size of 1 nm to 5 nm.

2. The method according to claim 1, further composing:
following the step (b), the step (c) of filtrating the obtained product and heating the product at a temperature of 550 to 600° C. in an inert atmosphere.

3. The method according to claim 1, wherein
the salt or the complex of Fe is at least one iron compound selected from the group consisting of iron nitrate, iron acetate, an iron ammine complex, an iron ethylene diamine complex, ethylene diamine tetra-acetate iron, tris(acetylacetonato) iron (III), iron (II) lactate trihydrate, iron (II) oxalate dihydrate and iron (III) citrate n-hydrate,
the salt or the complex of Co is at least one cobalt compound selected from the group consisting of cobalt nitrate, cobalt acetate, a cobalt ammine complex, a cobalt ethylene diamine complex, ethylene diamine tetra-acetate cobalt, a cobalt (II) acetylacetonato complex and a cobalt (III) acetylacetonato complex,
the salt or the complex of Pt is at least one platinum compound selected from the group consisting of platinum acetate, platinum nitrate, a platinum ethylene diamine complex, a platinum triphenyl phosphine complex, a platinum ammine complex, and a platinum acetylacetonato complex, and
the salt or the complex of Pd is at least one palladium compound selected from the group consisting of palladium acetate, palladium nitrate, a palladium triphenyl phosphine complex, a palladium ammine complex, a palladium ethylene diamine complex and palladium acetylacetonato complex.

4. The method according to claim 3, wherein
the salt or the complex of Fe is at least one iron compound selected from the group consisting of iron nitrate, iron acetate, tris(acetylacetonato) iron (III), iron (II) lactate trihydrate, iron (II) oxalate dihydrate and iron (III) citrate n-hydrate.

5. The method according to claim 1, wherein
the organic protective agent is a compound containing an oxygen atom or a nitrogen atom having an unshared electron pair.

6. The method according to claim 1, wherein
the organic protective agent is at least one compound selected from the group consisting of alkanolamine, polyvinyl pyrrolidone, polyvinyl alcohol, polyacrylic acid, cyclodextrin, amino pectin, and methyl cellulose.

7. The method according to claim 1, wherein
the organic protective agent is alkyl carboxylic acid and alkyl amine having 6 to 18 carbons.

8. The method according to claim 1, wherein
the alcohol is at least one alcohol selected from the group consisting of monohydric alcohols having 2 to 18 carbons and polyhydric alcohols having 2 to 18 carbons.

9. The method according to claim 1, wherein
the alcohol is at least one alcohol selected from the group consisting of ethylene glycol, glycerin, propylene glycol, isoamyl alcohol, n-amyl alcohol, sec-butyl alcohol, n-butyl alcohol, isobutyl alcohol, allyl alcohol, n-propyl alcohol, 2-ethoxy ethanol, and 1,2-hexadecane diol.

10. The method according to claim 1, wherein
the organic solvent to be mixed with the alcohol is at least one organic solvent selected from the group consisting of dioxane, tetrahydrofuran, N-methyl pyrrolidone, and acetone.

11. The method according to claim 2, wherein
the metal alloy fine particles have a CuAu-I type $L1_0$ ordered phase.

12. Metal alloy fine particles having a composition expressed by a general formula:

$$A_xB_yC_z$$

(where A is at least one selected from the group consisting of Fe and Co, B is at least one selected from the group consisting of Pt and Pd (provided that a combination of Co—Pd is excluded), and C is at least one element selected from the group consisting of Cu, Bi, Sb, Sn, Pb and Ag, and 2 at % $\leq z \leq 30$ at %, and 2/3 $\leq x/y \leq 3/2$).

13. The metal alloy fine particles according to claim 12, wherein
a particle size of the metal alloy fine particles is in a range from 1 nm to 50 nm.

14. The metal alloy fine particles according to claim 12, having a CuAu-I type $L1_0$ ordered phase.

15. A method for producing metal alloy fine particles comprising:
(a) dissolving the following substances in an alcohol alone, water and an alcohol, or an alcohol and an organic solvent that can be mixed with the alcohol in a presence of an organic protective agent:
(i) a salt or a complex of at least one transition metal selected from the group consisting of Fe and Co,
(ii) a salt or a complex of at least one noble metal selected from the group consisting of Pt and Pd (provided that a combination of Co—Pd is excluded); and
(iii) a salt or a complex of at least one additional element selected from the group consisting of Cu, Bi, Sb, Sn, Pb and Ag; and
(b) performing heating under reflux with an alcohol in an inert atmosphere, so as to produce metal alloy fine particles having a composition expressed by a general formula:

$$A_xB_yC_z$$

(where A is at least one selected from the group consisting of Fe and Co, B is at least one selected from the group consisting of Pt and Pd (provided that a combination of Co—Pd is excluded), and C is at least one element selected from the group consisting of Cu, Bi, Sb, Sn, Pb and Ag, and 2 at % $\leq z \leq$ 30 at %, and 2/3 $\leq x/y \leq$ 3/2).

16. The method according to claim 15, wherein
a particle size of the metal alloy fine particles is in a range from 1 nm to 50 nm.

17. The method according to claim 15, further composing:
following the step (b), the step (c) of filtrating the obtained product and heating the product at a temperature of 300 to 500° C. in an inert atmosphere.

18. The method according to claim 15, wherein
the salt or the complex of Fe is at least one iron compound selected from the group consisting of iron nitrate, iron acetate, an iron ammine complex, an iron ethylene diamine complex, ethylene diamine tetra-acetate iron, tris(acetylacetonato) iron (III), iron (II) lactate trihydrate, iron (II) oxalate dihydrate and iron (III) citrate n-hydrate, the salt or the complex of Co is at least one cobalt compound selected from the group consisting of cobalt nitrate, cobalt acetate, a cobalt ammine complex, a cobalt ethylene diamine complex, ethylene diamine tetra-acetate cobalt, a cobalt (II) acetylacetonato complex and a cobalt (III) acetylacetonato complex, the salt or the complex of Pt is at least one platinum compound selected from the group consisting of platinum acetate, platinum nitrate, a platinum ethylene diamine complex, a platinum triphenyl phosphine complex, a platinum ammine complex, and a platinum acetylacetonato complex, the salt or the complex of Pd is at least one palladium compound selected from the group consisting of palladium acetate, palladium nitrate, a palladium triphenyl phosphine complex, a palladium ammine complex, a palladium ethylene diamine complex and palladium acetylacetonato complex, and the salt or the complex of the additional element of Cu, Bi, Sb, Sn, Pb and Ag is at least one compound selected from the group consisting of their sulfates, nitrates, and acetates, ammine complexes, ethylene diamine complexes, cyan complexes, and ethylene diamine tetra-acetate complexes.

19. The method according to claim 15, wherein
the organic protective agent is a compound containing an oxygen atom or a nitrogen atom having a lone electron pair.

20. The method according to claim 15, wherein
the organic protective agent is at least one compound selected from the group consisting of alkanolamine, polyvinyl pyrrolidone, polyvinyl alcohol, polyacrylic acid, cyclodextrin, amino pectin, and methyl cellulose.

21. The method according to claim 15, wherein
the organic protective agent is alkyl carboxylic acid and alkyl amine having 6 to 18 carbons.

22. The method according to claim 15, wherein
the alcohol is at least one alcohol selected from the group consisting of monohydric alcohols having 2 to 18 carbons and polyhydric alcohols having 2 to 18 carbons.

23. The method according to claim 15, wherein
the alcohol is at least one alcohol selected from the group consisting of ethylene glycol, glycerin, propylene glycol, isoamyl alcohol, n-amyl alcohol, sec-butyl alcohol, n-butyl alcohol, isobutyl alcohol, allyl alcohol, n-propyl alcohol, 2-ethoxy ethanol, and 1,2-hexadecane diol.

24. The method according to claim 15, wherein
the organic solvent to be mixed with the alcohol is at least one organic solvent selected from the group consisting of dioxane, tetrahydrofuran, N-methyl pyrrolidone, and acetone.

25. The method according to claim 17, wherein the metal alloy fine particles have a CuAu-I type $L1_0$ ordered phase.

* * * * *